J. W. FAWCETT.
LATHE DOG.
APPLICATION FILED SEPT. 22, 1906.
958,382.
Patented May 17, 1910.
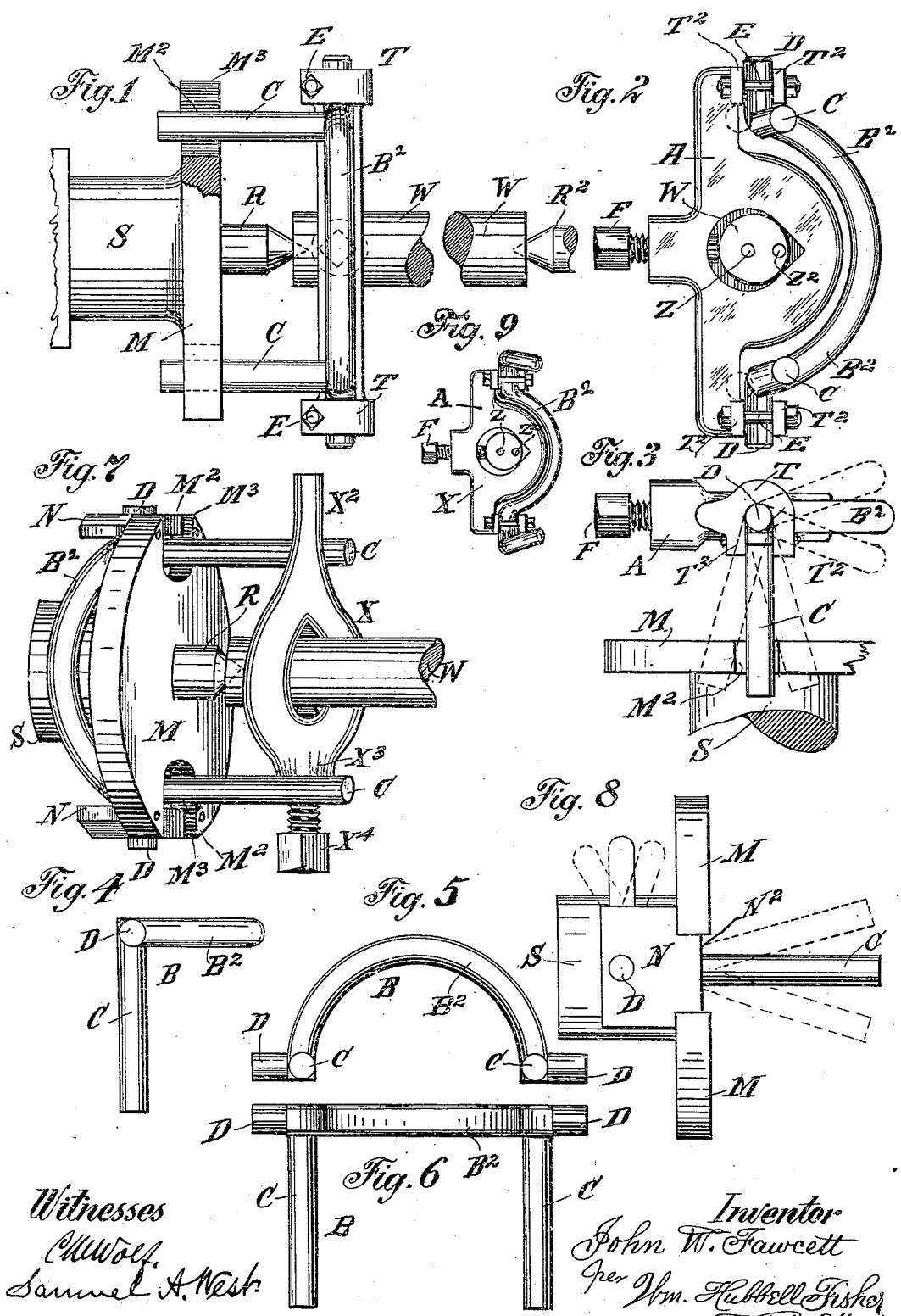

UNITED STATES PATENT OFFICE.

JOHN W. FAWCETT, OF LAWRENCEBURG, INDIANA, ASSIGNOR OF ONE-HALF TO WILLIAM B. J. JOHNSON, OF LAWRENCEBURG, INDIANA.

LATHE-DOG.

958,382.   Specification of Letters Patent.   Patented May 17, 1910.

Application filed September 22, 1906. Serial No. 335,685.

*To all whom it may concern:*

Be it known that I, JOHN W. FAWCETT, a citizen of the United States, and a resident of the city of Lawrenceburg, in the county of Dearborn and State of Indiana, have invented certain new and useful Improvements in Lathe-Dogs, of which the following is a specification.

The several features of my invention and the various advantages resulting from their use conjointly or otherwise will be apparent from the following description and claims.

In the accompanying drawings making a part of this application, in which similar letters of reference indicate corresponding parts,—Figure 1 is an elevation of a side of my improved lathe dog, fastened to a cylindrical piece of metal, the latter duly held between two centers. Fig. 2 is an elevation of that end of this lathe dog which faces toward the left in Fig. 1. The lathe dog, in this figure, is shown fastened to a piece of metal whose end shows two centers hereinafter more particularly specified. Fig. 3 is a top view of the mechanism shown in Fig. 1, and exhibiting the end of the dog where the rocker is pivoted. Fig. 4 is a top view or a bottom view of a rocker. Fig. 5 is an elevation of that side of the rocker which faces toward the spectator in Fig. 2. Fig. 6 is a view of that elevation of the rocker which faces toward the right in Fig. 2, and illustrating more particularly the driving pins. Fig. 7 is a perspective view of a face plate center, and of a piece of work (a cylindrical bar), and a common dog attached thereto, and my improved compensating device attached by pivots to the rear of the face plate, in position for driving this common dog. Fig. 8 is a top view or a bottom view of the face plate and hub and of the rocker, and illustrating the pivot journals and the movements of the two driving arms or pieces. Fig. 9 is a modification of the device shown in Figs. 1 and 2.

In the ordinary mode now commonly in use, namely: where a single common dog is used, which has one driving pin, this driving pin operates defectively as regards the perfection of the work that is to be done. Its defective operation is as follows:—When the driving pin is moving the dog on one side of the circle, the work is forced against the cutting tool and flutters. When the driving pin is on the other part of the circle, the work is, so to speak, drawn away from the tool, and the tool makes a smooth cut. If a double ended common dog is used, the effect would be exactly the same, if there was but one driving pin, or if there were two driving pins, when an adjustment is absent between the dog and one of the pins, because but one of the driving pins would be in action. So that the common double ended dog requires an adjusting screw in one of the driving pins to the intermediation of the screw so that both pins shall be in action and drive equally on the two opposite sides of the dog.

My invention obviates the necessity of having an adjusting screw on a double ended dog, because my driving pins are automatically adjustable and neither one of them will drive the dog until they both find a bearing.

I will now proceed to describe my invention in detail, in connection with those parts of a lathe necessary to be mentioned in connection with my invention in order to better understand the latter.

S indicates the hub of a face plate connected to the spindle of the lathe.

M is the ordinary lathe face plate, and of use in driving the dog.

R is the "live center", that is the front center which is on the spindle of the head-stock. $R^2$ indicates the dead or tail stock center, at the other end of the lathe.

One of the main features of my invention is the double ended dog, and in the employment of this dog, those pins of the rocker used to drive this dog find their place in the face plate M. Thus A indicates this double ended dog. The rocker B is illustrated by itself in Figs. 4, 5 and 6. It consists of a bow or arched piece $B^2$, carrying at each end a journal or pivot D, and a driving pin C. Thus it, the rocker, has two journals D, each extending outward and preferably in the plane of the bow $B^2$, and it has two driving pins C, C, extending out from the plane of the bow part $B^2$, but at an angle thereto, substantially as shown.

A is my improved dog, or dog-piece. It is provided at each end portion with pivot journal bearings T, $T^2$. Each of these journals is adapted to receive a rocker journal D. When the rocker journals D are respectively placed within the pivot journal bearings T, some means are necessary to retain these journals in place in the said bearings. A preferred means for this purpose consists of the pin, or rivet E, which passes through the free end of a journal bearing T, and thus prevents the rocker from dropping out. Of course there will be such a device E for each journal bearing T.

F indicates the set-screw for securing the dog A to the work.

The dimensions of the dog will vary according to the size of the face plate and the dimensions and kind of work to be done.

The driving pins or arms C, C, of the rocker B are respectively received in openings $M^2$, $M^2$, of the face plate M, or an equivalent part of the lathe. These openings $M^2$, $M^2$ are commonly slots, each having an open end $M^3$.

One of the advantages of that construction which embodies all of the features of my invention as illustrated in Figs. 1 and 2, consists in that it is applicable to any lathe or any size work.

The modification shown in Fig. 7 is applicable only to any particular and special lathe, namely: where the operator desires to have the invention applied to his particular lathe, and to use it in connection with the old fashioned double ended dog. It then operates in substantially the same manner as the construction shown in Figs. 1 and 2, but the driving pins are in a reverse position, thereby permitting the common dog to be used. Further description of the modification to which attention has already been called, and which is illustrated in Fig. 7, is as follows:—I locate the bow $B^2$ of the rocker behind the face plate M. I locate the driving pins C, C, respectively in the slots $M^2$, so that these driving pins shall extend forward as shown. The journals D, D, I respectively locate in journal bearings N, N,—one of these bearings N being at one of the slots $M^2$, and the other bearing N at the other slot $M^2$. A preferred mode of keeping these bearings in place is to provide each with a reduced piece or extension $N^2$, which latter fits into the outer part of the slot $M^2$ beyond where the driving pin is in said slot. Each extension $N^2$ of its bearing N is suitably secured by screws, rivets or otherwise to the face plate. Thus these driving pins C, C, in this construction, Fig. 7, are free to accommodate themselves to the ordinary double ended dog. In this way, namely: by this accommodation of themselves to the dog, they accomplish substantially the same advantageous results as are accomplished by the construction shown in Figs. 1 and 2. But as heretofore suggested, the construction including my improved dog of Figs. 1 and 2, is of far wider and more extended application than the modification in Fig. 7.

When the centers are in directions the opposite from those in Fig. 1, the dog can be changed over so that the set screw F will be at ninety degrees from where it is in Fig. 2. This would put the live center Z at equal distance from the two driving pins. The false center is preferably at a plane cutting at right angles between the end journals of the dog, but it can be at any other point.

In Fig. 2, I have illustrated at Z nearly a true center, and at $Z^2$ a false center, that is, one out of the true center of the piece W of work to be operated upon by the lathe tool. What I wish understood is that the point of the center R may be at $Z^2$ when the nature of the work to be done requires this change of center. Furthermore, the dog will accommodate itself not only to that change of center, but also any other change of center that may occur, or be needed. The illustrated instance is only one specific instance of a large number of those which may occur.

In connecting shafts where a single drive is wanted, where two shafts unite, a similar device to this can be used making a twisting power without the undesired crank effect. In such application, one shaft could be dropped a little lower than the other.

When desired, the driving pins or arms are to be set on the outer ends of the journal, as indicated in Fig. 9.

My invention is also of value in all cases where the center or centers of the lathe may be out of center or out of alinement. My invention is also applicable to the coupling of shafts of automobiles, and of other mechanism where flexibility of the shaft is required.

What I claim as new, and of my invention and desire to secure by Letters Patent, is:—

1. A dog, in combination with a rocker, the dog having journal or pivot bearings, the rocker consisting of the bowed body piece oscillating independently of the dog, and extended partly around the body of the lathe dog, to give clearance to the right and left of the dog and also to permit as large a dog as is necessary to carry the work, and provided with the two driving pins for revolving the work, the ends of the rocker being respectively pivotally connected to the dog at the respective journal or pivot bearings of the latter, substantially as and for the purposes specified.

2. The combination of a rocker, a double dog or driving piece, having terminal journal bearings engaging with the journal pivots of the rocker, the said journal bearings being located outside of the rocker, the rocker having a bowed body to give it clearance for oscillation, the rocker having driving pins, and a face plate adapted to receive said pins, said pivotal connection being located on the dog and outside of the same, substantially as and for the purposes specified.

3. In lathe mechanism, a rocker, a dog provided with arms extending in a plane to one side of the axial center of the lathe center, each arm separated from the adjacent portion of the dog which is nearer the lathe center by a space in which latter the rocker can oscillate, the said arms provided with journal bearings, in the plane of the axial center of the lathe center, to support the rocker, and the curved rocker carrying at each end a journal to engage the adjacent bearing on the dog, substantially as and for the purposes specified.

4. In a lathe mechanism, a rocker, a dog provided with arms extending in a plane to one side of the axial center of the lathe center, the said arms provided with journal bearings, in the plane of the axial center of the lathe center, in combination with the curved detachable rocker, pivotally connected to the journal bearings of the dog, substantially as and for the purposes specified.

5. In a lathe mechanism, a rocker, a dog provided with arms extending in a plane to one side of the vertical plane of the axial center of the lathe center, each arm separated from the adjacent portion of the dog which is nearer the lathe center by a space in which latter the rocker can oscillate, and the curved rocker pivotally connected at its respective ends to the respective arms of the dog, said pivotal connection being located on the dog and outside of the same, substantially as and for the purposes specified.

6. In lathe mechanism bowed rocker adapted to clear the periphery of the part which it is to embrace, provided with driving pins extending horizontally and with pivotal extensions rigid therewith, and a part which carries the rocker provided with journal bearings adapted to receive these extensions, and the said parts so respectively receiving these extensions having stops to prevent the extensions of the rocker slipping from place, substantially as and for the purposes specified.

7. The combination of a rocker having driving pins extending at right angles to its face, and located respectively at the respective end portions thereof, and further provided with journal extensions respectively extending radially out from the root of the driving pins, the rocker curved out in a semicircular form, and a dog having at each end a pair of flanges $T^2$, $T^2$, the said journal extensions being respectively secured within said adjacent pair of flanges, and a cross bolt E between the flanges outside of the said extensions.

8. The combination of the arched rocker B, of a semicircular form and adapted to embrace the dog A, the central portion of the dog A being of an enlarged semi-disk form, and the radius of its semi-disk being as great as that of the hub S of a lathe, the ends of this semicircular rocker B extending outward in the form of journals D, and stationary journal bearings suitably maintained, and respectively receiving the respective said journals, the axial center of the said journals being located in a line which passes to that side of the axial center of the "live center" R of the lathe, the rocker B being provided in the plane of the axial center of the said journals and close to the latter with the horizontally projecting arms C.

9. The combination of the arched rocker B, of a semicircular form and adapted to embrace the dog A, the central portion of the dog A being of an enlarged semi-disk form, and the radius of its semi-disk being as great as that of the hub S of a lathe, the ends of this semicircular rocker B extending outward in the form of journals D, and stationary journal bearings suitably maintained and respectively receiving the respective said journals, the rocker B being provided in the plane of the axial center of the said journals and close to the latter with the horizontally projecting arms C.

JOHN W. FAWCETT.

Attest:
JOHN E. FITZPATRICK,
K. SMITH.